United States Patent
Lemmers, Jr.

(10) Patent No.: US 9,476,459 B2
(45) Date of Patent: Oct. 25, 2016

(54) SPLINE LOCK SHAFT LOCKING SYSTEM

(71) Applicant: Hamilton Sundstrand Corporation, Charlotte, NC (US)

(72) Inventor: Glenn Lemmers, Jr., Loves Park, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 398 days.

(21) Appl. No.: 14/149,448

(22) Filed: Jan. 7, 2014

(65) Prior Publication Data

US 2015/0192177 A1    Jul. 9, 2015

(51) Int. Cl.
*F16D 1/04*    (2006.01)
*F16D 1/108*    (2006.01)
*F16D 1/116*    (2006.01)
*F16D 1/10*    (2006.01)

(52) U.S. Cl.
CPC ............... *F16D 1/04* (2013.01); *F16D 1/108* (2013.01); *F16D 1/116* (2013.01); *F16D 2001/103* (2013.01); *Y10T 29/49464* (2015.01); *Y10T 403/7033* (2015.01)

(58) Field of Classification Search
CPC .......... F16D 1/04; F16D 1/108; F16D 1/112; F16D 1/116; F16D 1/10; F16D 2003/13; F16H 57/0025; Y10T 403/7026; Y10T 403/7031; Y10T 403/7033; Y10T 403/30; Y10T 403/10
See application file for complete search history.

(56) References Cited

U.S. PATENT DOCUMENTS

| | | | | |
|---|---|---|---|---|
| 4,215,586 A * | 8/1980 | Morris, Sr. | ............. | F16H 3/085 74/15.2 |
| 4,225,263 A * | 9/1980 | Asberg | ............. | F16B 21/18 403/326 |
| 4,230,211 A * | 10/1980 | Goto | ............. | F16D 41/088 192/35 |
| 4,281,942 A * | 8/1981 | Gaeckle | ............. | F16N 7/36 277/566 |
| 4,625,846 A * | 12/1986 | Gomez | ............. | B60B 35/18 180/247 |
| 4,657,428 A * | 4/1987 | Wiley | ............. | B24B 45/006 30/388 |
| 4,730,952 A * | 3/1988 | Wiley | ............. | B24B 45/006 30/388 |
| 4,810,126 A * | 3/1989 | Lengel | ............. | B25G 3/16 285/375 |
| 5,156,483 A * | 10/1992 | Mangas | ............. | F16D 3/06 403/288 |
| 6,193,241 B1 * | 2/2001 | Robison | ............. | B23B 31/1071 279/128 |
| 6,250,905 B1 * | 6/2001 | Mailliet | ............. | B29C 45/6728 425/150 |
| 6,619,454 B2 * | 9/2003 | Hayward | ............. | F16D 9/02 192/40 |

(Continued)

FOREIGN PATENT DOCUMENTS

DE    3320444    10/1987
EP    2505860    10/2012

OTHER PUBLICATIONS

Extended European Search Report dated Nov. 10, 2015 in European Application No. 15150200.2.

*Primary Examiner* — Joshua J Michener
*Assistant Examiner* — Alp Akbasli
(74) *Attorney, Agent, or Firm* — Snell & Wilmer, L.L.P.

(57) ABSTRACT

A coupling shaft assembly system is disclosed. A coupling shaft assembly system may have a coupling shaft spline lock body having spline lock spline teeth, a main coupling shaft body having input spline teeth, and a locking bolt, wherein the locking bolt retains the coupling shaft spline lock body in substantially fixed communication with the main coupling shaft body, wherein the coupling shaft spline lock body retains the coupling shaft assembly system in mechanical communication with a power shaft. In this manner, a coupling shaft assembly system may reduce the axial forces transferred by the coupling shaft assembly system.

15 Claims, 5 Drawing Sheets

(56) References Cited

U.S. PATENT DOCUMENTS

| | | | | |
|---|---|---|---|---|
| 6,742,640 B1* | 6/2004 | Grogg | ................... | F16D 7/022 |
| | | | | 192/35 |
| 7,296,670 B2* | 11/2007 | Howard | ................... | F16D 9/02 |
| | | | | 192/144 |
| 2001/0052427 A1* | 12/2001 | Eppink | ................. | E21B 4/006 |
| | | | | 175/40 |
| 2002/0034998 A1* | 3/2002 | Tsunemi | .............. | B60K 7/0015 |
| | | | | 475/83 |
| 2003/0136541 A1* | 7/2003 | Chaterjee | ............. | B25B 23/141 |
| | | | | 164/112 |
| 2006/0213320 A1* | 9/2006 | Menjak | ................. | B62D 5/008 |
| | | | | 74/640 |
| 2007/0180705 A1* | 8/2007 | Chiu | ..................... | A01D 34/82 |
| | | | | 30/276 |
| 2008/0203682 A1* | 8/2008 | Neumeier | ................ | B23Q 1/70 |
| | | | | 279/143 |
| 2011/0281508 A1* | 11/2011 | Reid | .................... | B24B 23/022 |
| | | | | 451/359 |
| 2012/0085306 A1* | 4/2012 | Chu | ..................... | F02N 15/063 |
| | | | | 123/179.25 |
| 2012/0251234 A1* | 10/2012 | Lemmers, Jr. | ........... | F16D 1/02 |
| | | | | 403/359.5 |
| 2013/0133606 A1* | 5/2013 | Comandolli | ......... | F02N 15/023 |
| | | | | 123/179.4 |

* cited by examiner

SPLINE LOCK SHAFT LOCKING SYSTEM

FIELD

The present disclosure relates to coupling shaft systems, and more specifically, to coupling shaft systems that lock axially in place to reduce axial load transfer.

BACKGROUND

Many mechanical devices use shafts to transfer mechanical energy between different components. Often, these shafts may be disconnected in order to disengage the mechanical energy transfer between components. Frequently, shafts having splines are used to transfer this mechanical energy; however, such shafts undergo axial loading when in use, and when being connected and disconnected. Moreover, axial loading may be transferred to other components, causing wear and degradation of the components.

SUMMARY

In various embodiments, a coupling shaft assembly system may comprise a coupling shaft spline lock body comprising spline lock spline teeth, a main coupling shaft body comprising input spline teeth, a locking bolt, wherein the locking bolt retains the coupling shaft spline lock body in substantially fixed communication with the main coupling shaft body, wherein the coupling shaft spline lock body retains the coupling shaft assembly system in mechanical communication with a drive shaft, and wherein retaining the coupling shaft assembly system in mechanical communication with the drive shaft reduces axial forces transferred by the coupling shaft assembly system.

In various embodiments, a method of installing a coupling shaft assembly system comprises annularly rotating a coupling shaft spline lock body comprising spline lock spline teeth and a phasing slot with respect to a main coupling shaft body comprising input spline teeth and a phasing tab so that the input spline teeth are aligned in phase with the spline lock spline teeth, inserting the coupling shaft assembly system into an aperture of a power shaft comprising receiver splines and a receiver channel, wherein the input spline teeth are inserted in mechanical communication with the receiver splines, and wherein the spline lock spline teeth are inserted through the receiver splines and into the receiver channel, annularly rotating the coupling shaft spline lock body with respect to the main coupling shaft body so that the input spline teeth are misaligned with the spline lock spline teeth whereby the input spline teeth are out of phase with the spline lock spline teeth, tightening a locking bolt whereby the coupling shaft spline lock body and the main coupling shaft body are drawn together in substantially fixed communication and the phasing tab seats in the phasing slot.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

In various embodiments, a load device may accept mechanical energy input via a load drive shaft. In various embodiments, a mechanical energy source may provide mechanical energy via a power shaft. A coupling system may transfer mechanical energy from the power shaft to the load drive shaft. A mechanical energy delivery system may comprise a load device comprising a load drive, a coupling shaft assembly system, and a mechanical energy source comprising a power shaft, wherein the coupling shaft assembly system mechanically interfaces with the power shaft to receive mechanical energy from the power shaft, and wherein the coupling shaft assembly system mechanically interfaces with the load drive shaft to transfer mechanical energy to the load drive shaft.

Figure 1:
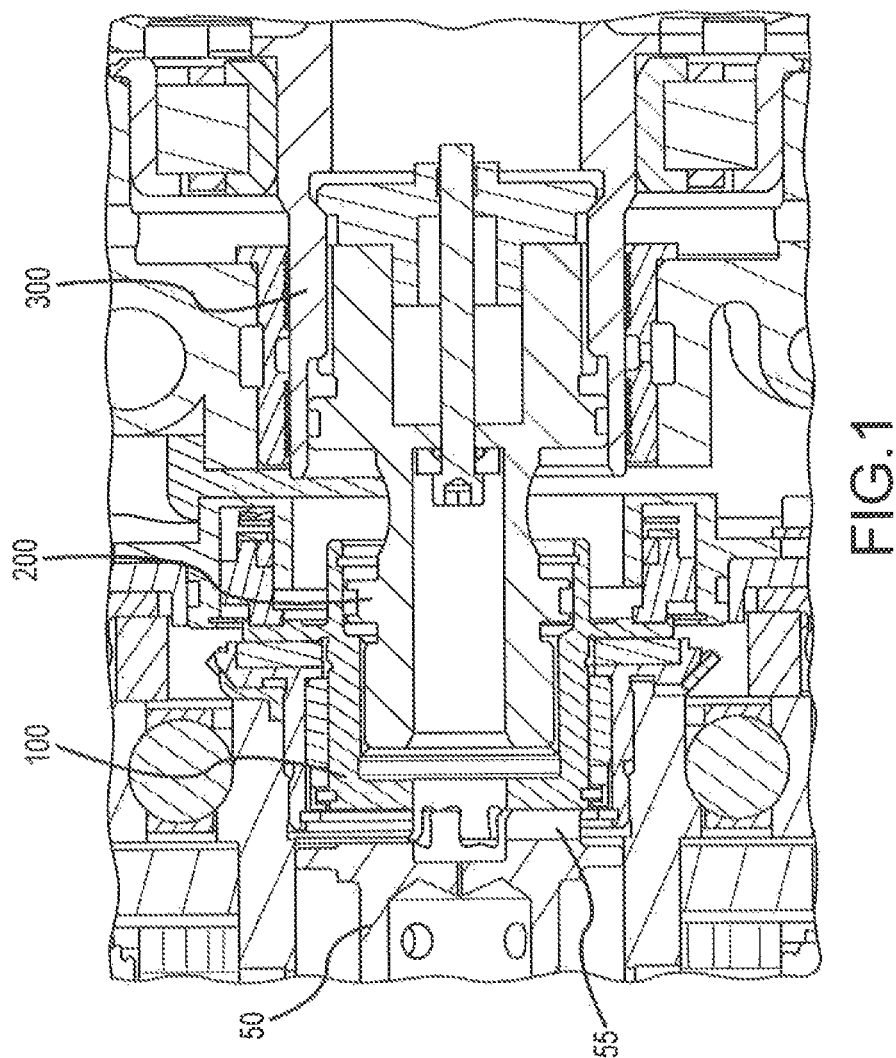
FIG. 1 illustrates a coupling shaft assembly system installed in mechanical communication with a load drive shaft and a power shaft according to various embodiments.

For example, with reference to FIG. 1, a mechanical energy delivery system may comprise power shaft 300, a coupling shaft assembly system 200, and a load drive shaft 100. In various embodiments, as described herein, coupling shaft assembly system 200 limits the transfer of axial loads among system components. For example, as further discussed, coupling shaft assembly system 200 may lock in substantially fixed axial position with respect to the power shaft 300. As a result, in various embodiments, axial inertial movement of coupling shaft assembly system 200 may be limited.

For example, in various embodiments, disconnect shaft 50 may mechanically interface with load drive shaft 100 via a face clutch 55. Disconnect shaft 50 may travel axially to mechanically connect and disconnect from face clutch 55. In this manner, axial loads may transfer to load drive shaft 100, for example, as a result of the axial force of disconnect shaft 50 making and breaking contact with face clutch 55. Moreover, in various embodiments, axial loads may transfer to load drive shaft 100 from other sources, such as internal pressure differentials or hydraulic pressure on system components. Thus, axial loads may be transferred from load drive shaft 100, into coupling shaft assembly system 200. In various embodiments, coupling shaft assembly system 200 may lock in substantially fixed axial position with respect to the power shaft 300. As a result, axial reaction forces, and/or axial kinetic impulses, and/or relative axial movement between coupling shaft assembly system 200 and power shaft 300 and/or load drive shaft 100 may be limited, for example, by preventing inertial movement of coupling shaft assembly system 200 and by facilitating more consistent axial load transfer from coupling shaft assembly system 200 to power shaft 300.

Similarly, axial loads may be transferred from power shaft 300 to coupling shaft assembly system 200. For example, in various embodiments, other system components may impart an axial load on power shaft 300. In this manner, axial loads may transfer to coupling shaft assembly system 200 and into load drive shaft 100. In various embodiments, coupling shaft assembly system 200 may lock in substantially fixed axial position with respect to the power shaft 300. As a result, axial reaction forces, and/or axial kinetic impulses, and/or relative axial movement between coupling shaft assembly system 200 and power shaft 300 and/or load drive shaft 100 may be limited, for example by preventing inertial movement of coupling shaft assembly 200 and by facilitating more consistent axial load transfer from power shaft 300 to coupling shaft assembly system 200.

Figure 2:
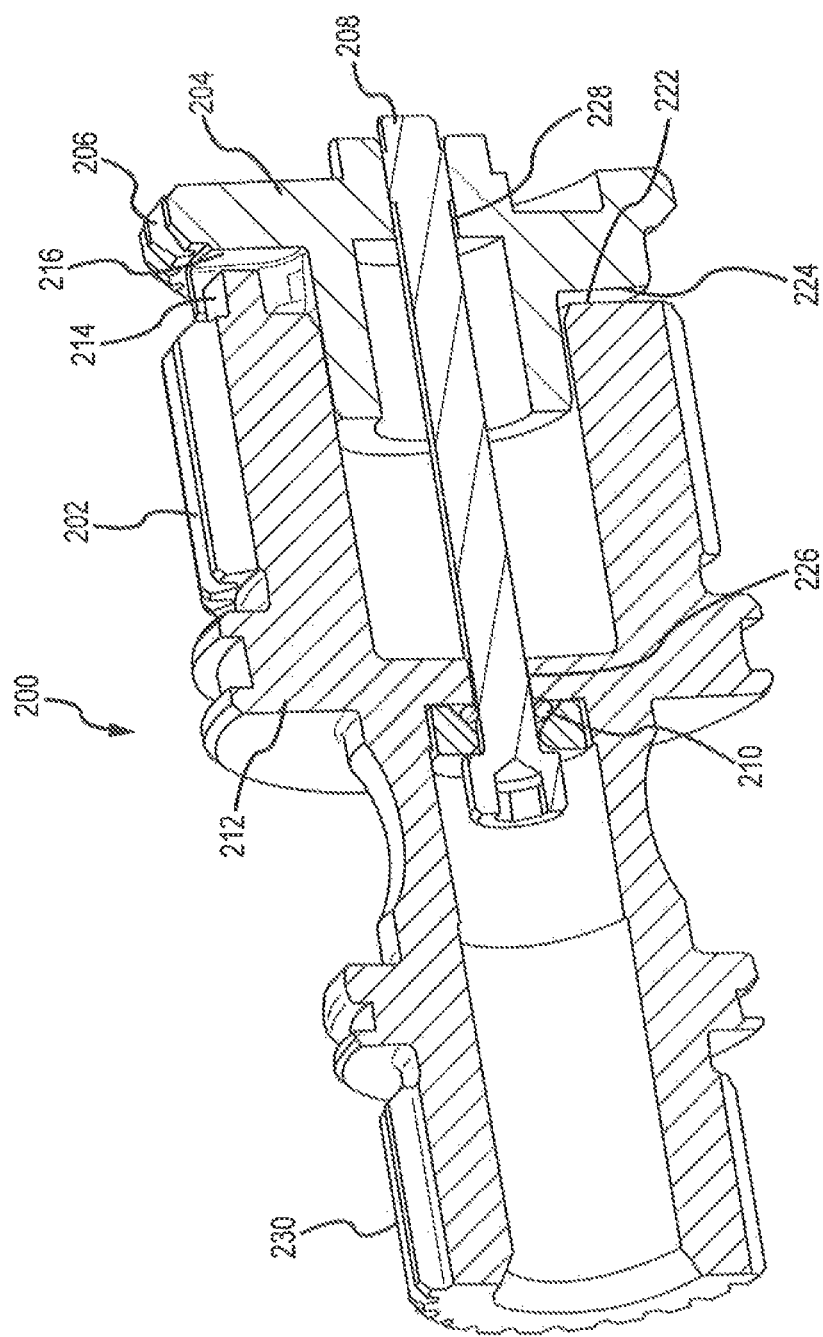
FIG. 2 illustrates various aspects of a coupling shaft assembly system according to various embodiments.
Figure 3:
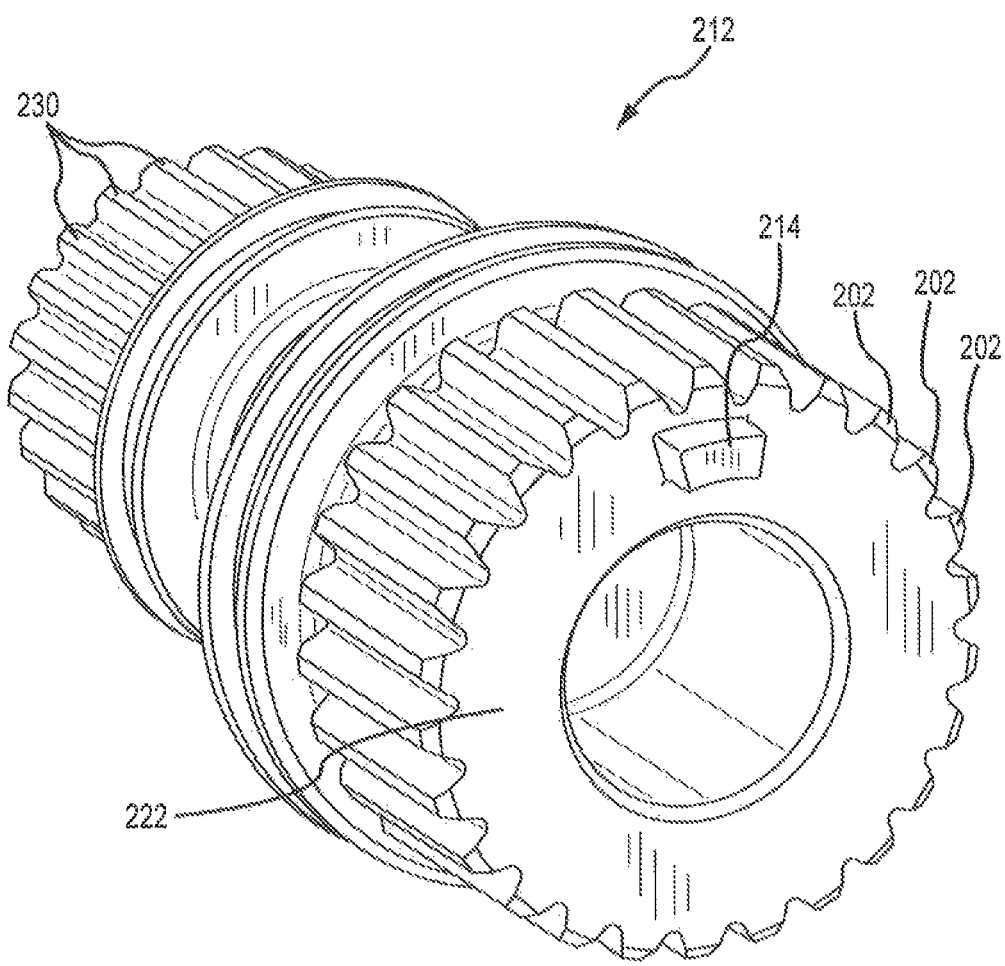
FIG. 3 illustrates various aspects of a main coupling shaft body of a coupling shaft assembly system according to various embodiments.
Figure 4:
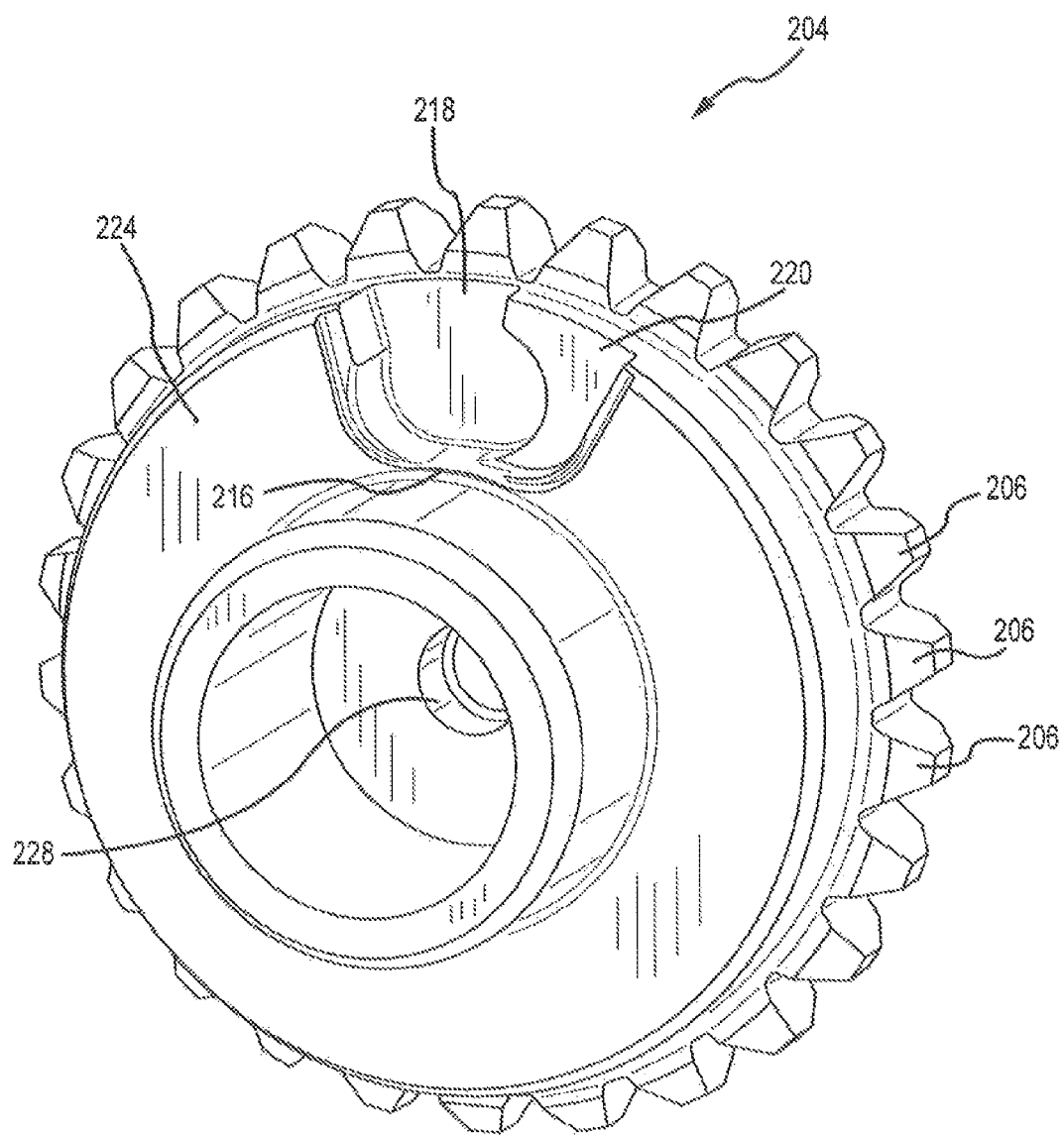
FIG. 4 illustrates various aspects of a coupling shaft spline lock body of a coupling shaft assembly system according to various embodiments.

In various embodiments, with reference to FIGS. 2-4, a coupling shaft assembly system 200 may comprise a coupling shaft spline lock body 204, a locking bolt 208, and a main coupling shaft body 212. In various embodiments, main coupling shaft body 212 comprises an annular face 222 and coupling shaft spline lock body 204 comprises an annular face 224. In various embodiments, main coupling shaft body 212 and coupling shaft spline lock body 204 abut so that annular face 222 abuts annular face 224. Main coupling shaft body 212 may comprise an aperture 226 through which locking bolt 208 may extend. Coupling shaft spline lock body 204 may comprise a corresponding aperture 228 into which locking bolt 208 extends. Locking bolt 208 may retain main coupling shaft body 212 and coupling shaft spline lock body 204 in mechanical communication, for example, via a fastener and/or an engagement structure. In various embodiments, an engagement structure may comprise mating threaded structures or self-locking helical coil inserts. An aperture and locking bolt may comprise mating threaded structures. For example, at least a portion of aperture 228 is threaded to retain locking bolt 208, which comprises a threaded portion configured to mate with the threaded portion of aperture 228. In various embodiments, locking bolt 208 is retained by a retaining clip, or a nut, or a nut and washer, or any other fastening mechanism whereby locking bolt 208 is retained. Moreover, aperture 226 comprises a bolt seal 210 whereby aperture 226 is sealed, for example, to prevent lubricating oil from escaping through aperture 226.

In various embodiments, with continuing reference to FIG. 2, main coupling shaft body 212 may comprise input spline teeth 202. In this regard, the main coupling shaft body 212 may mechanically interface with a mechanical energy source. In various embodiments, the main coupling shaft body 212 may mechanically interface with a power shaft 300. For example, with momentary reference to FIG. 5, input spline teeth 202 may interface with receiver spline teeth 310 of a power shaft 300. Input spline teeth 202 may have a number, a thickness, and a height corresponding with the receiver spline teeth 310 of power shaft 300.

In various embodiments, and with continuing reference to FIGS. 2-4, main coupling shaft body 212 also comprises output spline teeth 230. In this regard, the main coupling shaft body 212 may mechanically interface with a load device. In various embodiments, the main coupling shaft body 212 may mechanically interface with a load drive shaft 100. For example, output spline teeth 230, may interface with corresponding spline teeth on load drive shaft 100.

In various embodiments, a coupling shaft spline lock body 204 may comprise spline lock spline teeth 206. Spline lock spline teeth 206 may have a number, a thickness, and a height substantially equivalent to the number, thickness, and height of input spline teeth 202. In various embodiments, spline lock teeth 206 may have a number that is fewer than input spline teeth 202. In various embodiments, spline lock teeth 206 may have a number that is one-half that of input spline teeth 202. Moreover, in various embodiments, the thickness and/or height of spline lock spline teeth 206 may be less than the thickness and/or height of input spline teeth 202, for example to facilitate increased manufacturing tolerances. As will be discussed further herein, coupling shaft spline lock body 204 may lock coupling shaft assembly system 200 in substantially fixed axial position with respect to the power shaft 300. In this manner, coupling shaft assembly system 200 may limit the transfer of axial loads among system components.

In various embodiments, with reference to FIG. 3, main coupling shaft body 212 may also comprise a phasing tab 214. A phasing tab 214 comprises a tab extending axially from the main coupling shaft body 212, for example, from annular face 222. In various embodiments, the tab may comprise a three-dimensional tab shaped to follow a circular arc having a constant radius less than that of the annular face 222 of the main coupling shaft body 212. In various embodiments, the arc of the phasing tab may subtend an angle wherein the angle has a vertex coincident with the center of annular face 222 of the main coupling shaft body 212 and wherein the angle is less than 180 degrees. In various embodiments, the angle is 15 degrees, and in various embodiments the angle is between 5 and 175 degrees. In various embodiments, a main coupling shaft body 212 may comprise two phasing tabs 214, or three phasing tabs 214 or any number of phasing tabs 214. Moreover, in various embodiments, phasing tab 214 may be round, for example, in various embodiments wherein phasing tab 214 comprises a pressed pin. Phasing tab 214 may be any shape and/or orientation adapted to interface with phasing slot 216 according to the principles disclosed herein.

In various embodiments, with reference to FIG. 4, coupling shaft spline lock body 204 may comprise a phasing slot 216. Phasing slot 216 may comprise a locked portion 218 and an unlocked portion 220. With additional reference to FIG. 5, phasing slot 216 is configured so that phasing tab 214 may fit therein. Moreover, phasing slot 216 is configured so that phasing tab 214 may fit therein in two different configurations. For example, with continuing reference to FIG. 5, phasing slot 216 comprises a locked portion 218 wherein phasing tab 214 may fit when the coupling shaft assembly system 200 is in the locked configuration, and comprises an unlocked portion 220 wherein phasing tab 214 is free to move when coupling shaft assembly system 200 is in the unlocked configuration.

In various embodiments, the locked portion 218 of phasing slot 216 is located at a position along the annular face 224 of the coupling shaft spline lock body 204 so that when phasing tab 214 is fit within the locked portion 218 of phasing slot 216, the spline lock spline teeth 206 are positioned out of phase with the input spline teeth 202 of the main coupling shaft body 212. In this regard, the input spline teeth 202 and the spline lock spline teeth 206 are intentionally misaligned.

In various embodiments, the unlocked portion 220 of phasing slot 216 is located at a position along the annular face 224 of the coupling shaft spline lock body 204 so that when phasing tab 214 is fit within the unlocked portion 220 of phasing slot 216, the spline lock spline teeth 206 are positioned in phase with the input spline teeth 202 of the main coupling shaft body 212. In this regard, the input spline teeth 202 and the spline lock spline teeth 206 are intentionally aligned.

In various embodiments, a coupling shaft spline lock body 204 may comprise two phasing slots 216, or three phasing slots 216, or any number of phasing slots 216 suitable to interface with phasing tabs 214. In various embodiments, there may be more phasing slots 216 than phasing tabs 214. In various embodiments, coupling shaft spline lock body 204 may comprise phasing tabs 214 and the main coupling shaft body 212 may comprise phasing slots 216. In various embodiments, coupling shaft spline lock body 204 may comprise both phasing tabs 214 and phasing slots 216 and main coupling shaft body 212 may comprise both phasing tabs 214 and phasing slots 216. Thus, various components of coupling shaft assembly system 200 may comprise any combination or number of phasing tabs 214 and phasing slots 216 suitable to permit coupling shaft assembly system 200 to operate according to the principles disclosed herein.

Figure 5:
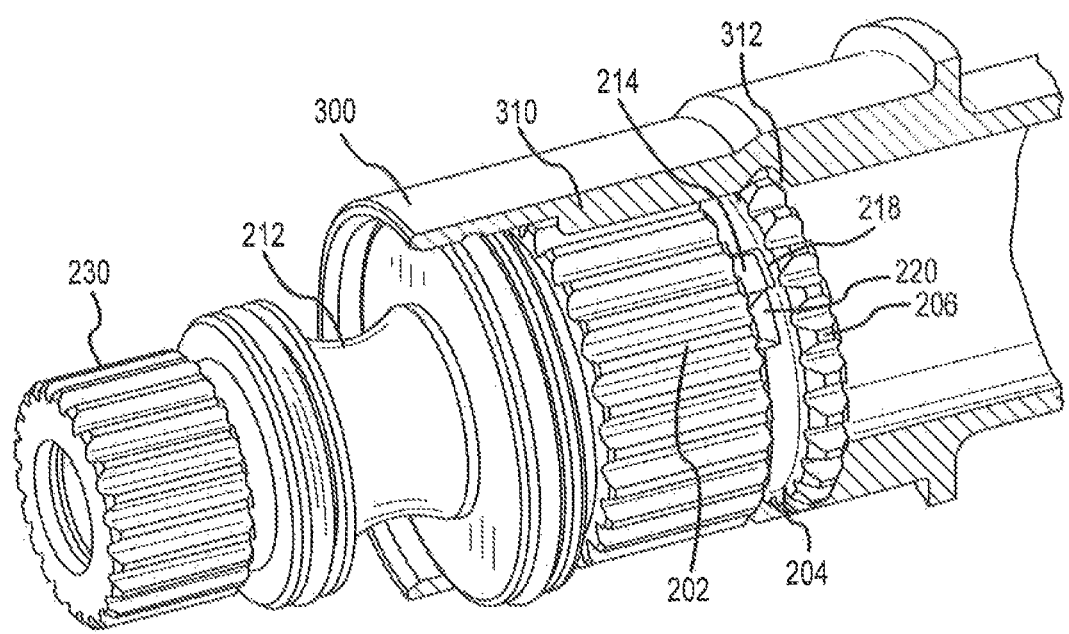
FIG. 5 illustrates a coupling shaft assembly system installed in mechanical communication with a power shaft according to various embodiments.

Now, having described the various components of a coupling shaft assembly system 200, a coupling shaft assembly system may be installed according to various methods. For example, the locking bolt 208 may be loosened so that the coupling shaft spline lock body 204 and the main coupling shaft body 212 are not held in fixed position, but can rotate annularly about the axis provided by the locking bolt 208. In this regard, coupling shaft assembly system 200 may be put in the unlocked configuration, so that phasing tab 214 may enter the unlocked portion 220 of the phasing slot 216. With reference to FIG. 5, the coupling shaft assembly system 200 may be inserted into a power shaft 300 and the input spline teeth 202 inserted into the receiver spline teeth 310. The spline lock spline teeth 206 may be passed through the receiver spline teeth 310 and may reside in a receiver channel 312. The locking bolt 208 may then be tightened, drawing the coupling shaft spline lock body 204 and the main coupling shaft body 212 together and causing phasing tab 214 to enter locked portion 218 of the phasing slot 216. Thus, annular face 224 of coupling shaft spline lock body 204 may be pressed in substantially fixed communication with annular face 222 of main coupling shaft body 212. In various embodiments, the locking bolt 208 is tightened inertially, for example, by inertial movement of coupling shaft spline lock body 204 and/or locking bolt 208 relative to the main coupling shaft body 212 upon rotational acceleration of the coupling shaft assembly system 200. In this regard, it may be said that the locking bolt 208 is tightened by the "rundown torque" of the coupling shaft spline lock body 204 and/or the locking bolt 208.

Moreover, as phasing tab 214 seats within locked portion 218 of phasing slot 216, the coupling shaft spline lock body 204 is prevented from rotating annularly about the axis provided by the locking bolt 208 so that the spline lock spline teeth 206 are positioned out of phase with the input spline teeth 202 of the main coupling shaft body 212. In this regard, the spline lock spline teeth 206 are prevented from exiting the receiver channel 312 due to the intentional interference with the receiver spline teeth 310 caused by the phase angle between the spline lock spline teeth 206 and the input spline teeth 202. Thus, coupling shaft spline lock body 204 may lock coupling shaft assembly system 200 in substantially fixed mechanical communication with power shaft 300. In various embodiments, the locking of coupling shaft assembly system 200 in substantially fixed mechanical communication with power shaft 300 reduces the transfer of axial loading to other system components, for example, by dampening axial movement of the coupling shaft assembly system 200. In various embodiments, the range of axial movement of coupling shaft assembly system 200 is limited to approximately the clearance between receiver channel 312 and spline lock spline teeth 206.

Now, having described various components of coupling shaft assembly systems and methods of installing coupling shaft assembly system, a coupling shaft assembly system may be manufactured from various materials. In various embodiments, a coupling shaft assembly system may comprise steel and/or stainless steel. However, in further embodiments, a coupling shaft assembly system may comprise other metals, such as aluminum, titanium, tungsten, or copper, though it may further comprise numerous other materials configured to provide durability under load. In various embodiments, various portions of coupling shaft assembly systems as disclosed herein are made of different materials or combinations of materials, and/or may comprise coatings.

In various embodiments, coupling shaft assembly systems may comprise multiple materials, or any material configuration suitable to enhance or reinforce the resiliency and/or support of the system when subjected to wear in an operating environment or to satisfy other desired electromagnetic, chemical, physical, or biological properties such as mass, elasticity, conductivity, and operating temperature range, among others.

In various embodiments, one will appreciate in light of the present disclosure, that the coupling shaft assembly systems described herein may be used on various applications such as, for example, aircraft generator systems, power train systems, industrial systems or processes, vehicle drive systems, power generation systems, power takeoff ("PTO") systems, and other systems or processes. Moreover, the coupling shaft assembly systems described herein may be employed with any mechanical energy source in any installation. In various embodiments, the coupling shaft assembly systems described herein are used in the context of a generator for use in an aircraft. Thus, in various embodiments, the coupling shaft assembly systems described herein provide cost effective and reliable mechanical energy transfer. Furthermore, the coupling shaft assembly systems described herein may be utilized to eliminate the need for an accessory blanking plate when a load device is disconnected from a mechanical energy source. For example, the coupling shaft assembly system may be locked in substantially fixed axial position with respect to another shaft to ameliorate the risk of dirt or other foreign objects entering.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of installing a coupling shaft assembly system comprising:
    annularly rotating a coupling shaft spline lock body comprising spline lock spline teeth and a phasing slot with respect to a main coupling shaft body comprising input spline teeth and a phasing tab so that the input spline teeth are aligned in phase with the spline lock spline teeth;
        inserting the coupling shaft assembly system into an aperture of a power shaft comprising receiver splines and a receiver channel,
        wherein the input spline teeth are inserted in mechanical communication with the receiver splines, and
        wherein the spline lock spline teeth are inserted through the receiver splines and into the receiver channel;
    annularly rotating the coupling shaft spline lock body with respect to the main coupling shaft body so that the input spline teeth are misaligned with the spline lock spline teeth whereby the input spline teeth are out of phase with the spline lock spline teeth;
    tightening a locking bolt whereby the coupling shaft spline lock body and the main coupling shaft body are drawn together in substantially fixed communication and the phasing tab seats in the phasing slot,
    wherein the phasing slot comprises an unlocked portion comprising a first recess having a first depth in an axial direction and a locked portion comprising a second recess having a second depth in the axial direction, wherein the first depth is less than a length of the phasing tab and the second depth is greater than the first depth, wherein the tightening the locking bolt further causes the coupling shaft spline lock body to rotate with respect to the main coupling shaft body and causes the phasing tab to move from the unlocked portion of the phasing slot to the locked portion of the phasing slot.

2. The method of claim 1, wherein the tightening a locking bolt comprises:
    rotating the coupling shaft assembly;
    transmitting an inertial torque to the locking bolt in response to the rotating; and
    rotating the locking bolt in response to the torque.

3. The method of claim 1, further comprising:
    limiting axial movement of the coupling shaft assembly system in response to the inserting the spline lock spline teeth through the receiver splines and into the receiver channel; and
    reducing the transfer of an axial load by the coupling shaft assembly system in response to the limitation.

4. The method of claim 1, wherein the causing the phasing tab to move from the unlocked portion of the phasing slot further comprises seating the phasing tab more deeply in the phasing slot.

5. The method of claim 1, further comprising:
    loosening a locking bolt retaining a coupling shaft spline lock body comprising spline lock spline teeth in substantially fixed communication with a main coupling shaft body comprising input spline teeth; and
    spinning the coupling shaft assembly system whereby the power shaft transfers mechanical energy to a load drive shaft.

6. A coupling shaft assembly system comprising:
    a coupling shaft spline lock body comprising spline lock spline teeth and a phasing slot disposed along an annular face of the coupling shaft spline lock body;
    a main coupling shaft body comprising input spline teeth and a phasing tab configured to be inserted into the phasing slot;
    a locking bolt, wherein the locking bolt retains the coupling shaft spline lock body in substantially fixed communication with the main coupling shaft body, wherein the coupling shaft spline lock body retains the coupling shaft assembly system in mechanical communication with a power shaft,
    wherein the phasing slot comprises an unlocked portion comprising a first recess having a first depth in an axial direction and a locked portion comprising a second recess having a second depth in the axial direction, wherein the first depth is less than a length of the phasing tab and the second depth is greater than the first depth.

7. The coupling shaft assembly system according to claim 6, wherein the spline lock spline teeth and the input spline teeth are present in at least one of a 1:1 ratio and a 1:2 ratio.

8. The coupling shaft assembly system according to claim 6, further comprising a bolt seal surrounding the locking bolt and positioned around an aperture of the main coupling shaft body.

9. The coupling shaft assembly system according to claim 6, wherein the locking portion comprises a second recess is shaped to accept the phasing tab.

10. The coupling shaft assembly system according to claim 6, wherein the phasing tab is shaped to follow a circular arc having a constant radius less than that of the main coupling shaft body wherein the arc of the phasing tab subtends an angle wherein the angle has a vertex coincident with a central axis of the main coupling shaft body.

11. The coupling shaft assembly system according to claim 6, wherein the phasing tab inserts into the locked portion of the phasing slot, and wherein, in response to the phasing tab being in the locked portion of the phasing slot, the input spline teeth and the spline lock spline teeth are misaligned.

12. The coupling shaft assembly system according to claim 6, wherein the phasing tab is free to move within the unlocked portion of the phasing slot, and wherein in response to the phasing tab being in the unlocked portion of the phasing slot, the input spline teeth and the spline lock spline teeth are aligned.

13. The coupling shaft assembly system according to claim 6, further comprising a second phasing slot.

14. The coupling shaft assembly system according to claim 13, further comprising a second phasing tab.

15. The coupling shaft assembly system according to claim 6, wherein the spline lock spline teeth prevent the coupling shaft assembly system from moving axially relative to the power shaft in response to the looking bolt being tightened, the locking bolt causing the phasing tab to enter the locked portion in response to the tightening.

\* \* \* \* \*